Patented May 1, 1928.

1,668,476

UNITED STATES PATENT OFFICE.

WILLIAM BURTON WESCOTT, OF QUINCY, MASSACHUSETTS, ASSIGNOR TO RUBBER LATEX RESEARCH CORPORATION, OF BOSTON, MASSACHUSETTS, A CORPORATION OF MASSACHUSETTS.

ABRASIVE ARTICLE AND PROCESS OF MAKING THE SAME.

No Drawing. Application filed September 16, 1925, Serial No. 56,782. Renewed February 11, 1928.

This invention relates to abrasive articles and processes of making the same; and it comprises an abrasive article carrying granular abrasive matter bonded by a composite binder carrying reinforcing fiber in random arrangement, said binder comprising a skin coating of intermediate binder on the granules and a body of rubber, said rubber being usually in part gelled latex rubber, the grains being frequently of two sizes in order to lessen void volume and in the case of an abrasive wheel the article as a whole being often made with a central fabric reinforcement; and it also comprises a method of making such articles wherein abrasive grains are coated with a plastic capable of adhering thereto, are admixed with fiber and sometimes with rubber particles and the whole bonded into shape with rubber latex; in making wheels a central fabric layer with two lateral layers of bonded abrasive being often used; all as more fully hereinafter set forth and claimed.

In making abrasive articles, granulated abrasive is bonded with very many things for various purposes; but for cutting wheels and shaped articles for special purposes, on the whole hard rubber gives the best results; this being by reason of the elasticity and strength of hard rubber, which enables the wheel or article to withstand side pressure or sudden shocks to a far greater extent than can wheels or articles made with a vitreous bond. These rubber bonded articles are made in the usual way; rubber, fillers, etc., being milled together with the abrasive, shapes produced and these vulcanized. While very good articles can be made in this way, there are a number of inherent disadvantages. For one thing, rubber and rubber compositions do not effectively "wet" and cohere to the surfaces of most of the ordinary abrasive materials, such as carborundum, alundum, siloxicon, corundum, silica, emery, garnet, etc. And in such a rubber bonded wheel, the abrasive particles are held mainly by locking engagement. As the wheel wears down, particles fly off. And milling a composition containing abrasive materials is not only hard on the milling machinery, but results in the production of a certain amount of fines which are undesirable in a cutting wheel. With fine abrasive material packed about the larger grains, a wheel is made dense and slow cutting. To the extent of the presence of fines, it is converted into a grinding wheel rather than a cutting wheel. As the optimum operating speed of a rubber bonded wheel is rather high, dense wheels heat and frequently burn the stock being operated on. This is undesirable and also reacts against the wheel itself by softening and burning the rubber bond, thus shortening its effective life. In such a rubber bonded wheel, it would be an advantage to have a certain amount of relatively long fiber to act as a reinforcement. It is, however, impracticable to mill long fiber into rubber; and particularly where sharp edged abrasive grains are also present. The fiber is comminuted.

An ideal rubber bonded wheel should be strong, resist side pressure, be relatively open-textured and free cutting and should so retain the grains as to permit them to function at least until dulled by actual work performed. It is the object of the present invention to produce a wheel, or other abrasive shaped article, having the desired characteristics; this being done by the use of various expedients.

In another and prior application, Serial No. 601,910, whereon the present application is in some respects an improvement, I have produced improved rubber bonded abrasive articles by mixing hard rubber particles (such as buffings), partially cured rubber particles, fiber and abrasive grains into a mass with the aid of latex; the whole being dried and vulcanized. The final article carries abrasive grains bonded by an integral mass of rubber reinforced by fiber in random arrangement; this rubber coming from three sources, hard rubber, soft rubber and latex. So far as this last rubber is concerned it is formed or produced in situ.

In the present invention the same type of composition may be used, but the abrasive grains are covered with an intermediate binder having a cohering union with the surface of the abrasive granules and also serving as an anchorage for the fiber. Many of such binders, although not all, will cohere also to the rubber. There are various plastic materials which may be employed for this purpose and which cohere more or less to hard rubber vulcanized against them under pressure. Among such substances may be mentioned glue, casein, gilsonite, the so-called "mineral rubber" hydrocarbons, bakelite, tung oil, linseed oil and certain elastic varnishes. Preliminary to the manufacture of the abrasive article, the abrasive grains are coated with one of these compositions; being, for example, wetted with glue solution, with gilsonite cut by benzene, with a little melted pitch, etc. The excess solution is then removed by draining or by treatment in a centrifugal. Grains so treated may be incorporated into a rubber composition by the methods hereinafter set forth. With these intermediate binders, however, whether cohering to the rubber or not, not having exactly the physical properties of vulcanized rubber, there is a cleavage tendency at the interface. For this reason and also because reinforcing fiber is desirable in the wheel in any event, I use a filamentary reinforcement; the fibers extending across the interface so as to link rubber and intermediate binder together.

While, as stated, fibers of any substantial length cannot occur in a milled rubber composition, long fibers and rubber can be combined by the expedient described in my prior application of using latex. Latex is the milky juice or sap tapped from Hevea trees and rapidly coagulates with the formation of ordinary raw rubber; coagulation extending from centers or nuclei and giving a reticulate structure to the rubber. Coagulation may be produced by acids, phenols or even by mechanical agitation. The best plantation rubber is produced by coagulation by acetic acid; the coagulum being then sheeted and washed to some extent. For producing ordinary rubber articles, the sheets are afterwards milled. In latex the rubber producing substance exists as an extremely fine dispersion, the fineness being such that the liquid rapidly penetrates capillaries as a whole. Latex can be stabilized against coagulation by the presence of a little ammonia, and as so stabilized, it is a commercial article. Latex of this type is used in the present invention. Commercial latex rarely carries more than 30 per cent of rubber and often contains less. It is quite an impure article and latex rubber made from commercial rubber latex is apt to darken, become tacky and otherwise deteriorate with age. Latex can, however, be purified, concentrated and standardized by certain treatments invloving the use of a centrifugal of the general type of those used as cream separators; the latex being washed in the machine by other liquids adapted to displace the natural serum. In another and copending application, Serial No. 601,909, I have described and claimed methods of purifying latex. Such purified and standardized latex is advantageously, but not necessarily, used in the present invention.

As commercial latex carries not more than about 30 per cent rubber and as in the completed article it is necessary to have all voids filled, in making articles under the present invention, it is desirable to use additional rubber from another source in using latex in making the bond. The less the void volume to be satisfied by the latex rubber as a bonding body, the thinner the bonding layers and the stronger the bond. It is desirable, however, to have substantial proportions of latex rubber present. Dried latex rubber has great strength, being more nearly comparable with long milled rubber in this respect than is coagulation rubber. Where latex rubber is dried as a whole to produce a gel cementing the other components of the wheel together, strong and good articles can be produced without any necessity of milling. While coagulation can be used in producing the present articles and for some purposes is so used, ordinarily the latex is dried or gelled in place.

In making articles under the present invention, the various components are simply mixed together with the aid of latex as a blending liquid and the desired shapes produced. If vulcanized articles are desired, sulfur and suitable accelerators may be components of the mixture. Otherwise, the whole is simply dried and pressed, gelling of the latex being relied on for bond. The molded mass may be a sheet from which wheels or other articles are later cut. Usually, but not always, I employ preformed rubber from some suitable source as a part of the composition. It may be omitted where small size granules or abrasive fines are used. Hard rubber buffings and comminuted hard rubber scrap may be used as part of the preformed rubber. It is advantageous also to include softer rubber not completely vulcanized as part of the mixture. The abrasive used is previously coated with an intermediate binder. The latex used may be a specially purified material or may be the commercial article. It is a useful expedient at times to bring the fiber, or some portion of it, and the coated abrasive articles together previously in some way. For example, the wet abrasive grains coming from the draining operation, while still in a tacky condition, may be mixed with cotton or other fiber. Relatively short fiber may be used in this operation and blown into place by an air blast. This way has several advantages, the coated grains being covered with fiber and dried in the same operation. Cotton flock may be blown against and into contact with the grains. In so doing, the fiber is united to the coating layer and the grains are kept from sticking together in drying, being spaced apart somewhat. Incorporation of some fiber in this way materially facilitates subsequent operation. Short fibers or flock will serve here. In the final article, they give anchorage across the interface between intermediate binder and rubber composition. In the complete abrasive article, however, I want relatively long fibers for their reinforcing function. These are admixed later in forming the plastic mass. Comminuted tire scrap is a convenient source of relatively long fiber and preformed rubber.

In making coarse grained or cutting articles, it is advantageous to use two grain sizes of abrasive, thereby not only increasing the proportion of abrasive which can be used and giving a stronger wheel, but enabling a decrease in the proportion of latex rubber to abrasive. This use of two grain sizes is particularly useful in employing coarse materials. With the smaller grains of such a size as to fit into normal void spaces of the larger size without substantially increasing the coarse grain spacing, a stronger wheel results, less rubber and fiber are necessary, there is greater grain-to-grain contact and the effective life of the wheel is lengthened without appreciably lowering the free cutting character.

After making the mixture described, the plastic mass is placed in appropriate trays and dried; this drying being advantageously in a vacuum at a temperature of about 150° F., and drying being carried to such a point that the moisture content of the fiber is less than that normal to the fiber under atmospheric conditions. In making the composition, the components are so proportioned that, including latex rubber, there will be enough binder to fill the voids between the abrasive granules. After drying, however, since the latex has lost 70 per cent of its volume, the article at this time is an open textured mass containing latex rubber as a spongy, soft material, readily welding together under pressure. If coagulated rubber is wanted instead of gelled rubber, as is sometimes although rarely the case, prior to the completion of drying the spongy, open-textured mass is exposed to the vapors of acetic acid. After drying in either event, the mass is usually (but not always) partially compressed, preferably in a platen press. It may be used without such pressure. While complete articles may be made by molding the mass into desired shapes and carrying the shapes through the described operations, it is usually more convenient to make sheets or layers from which the articles are cut. If the article is to be vulcanized, it may be cut to conform roughly to the mold in which the article is to be cured. Curing or vulcanization is performed in the usual manner.

I sometimes find it desirable, particularly when making thin wheels of considerable diameter, to use a further central reinforcement in the form of a layer of dense fiber or fabric, as stated. This is usually accomplished by spreading a layer of latex wetted mass in a tray or pan, laying upon the first layer a sheet of cotton batting or a sheet of so-called mechanical felt, that is, a weave with a heavily napped surface and spreading upon this layer an amount of grain and adhering fiber substantially equal to the first layer and then saturating the whole with latex in place. A reinforcing web of this character is particularly useful in making thin cutting wheels, such as those used in cutting tungsten into contact points. Sometimes these wheels are so thin as to retain rigidity largely by the centrifugal action due to their high speed. It is in these very thin wheels that the reinforcement is particularly desirable. It is practicable to make such reinforced wheels by making three layers separately, one containing fabric, and afterwards assembling.

In the present invention, it is desirable to make an abrasive article containing a sufficient amount of rubber, fiber and intermediate binder just to satisfy the grain voids after the compression of the mass to grain-to-grain contact.

The fiber has a number of advantages in the present operation, in addition to its reinforcing functions in the final article. In the presence of fiber, more liquid latex may be added. The use of preformed rubber as a component of the mixture is particularly advantageous in making articles containing the coarser sizes of abrasive granules.

It is sometimes advantageous to assemble long fiber with the grain as well as short fiber preliminarily to making the plastic mass. In so doing, the grains carrying intermediate binder and adherent short fibers are slowly tumbled with the additional long fiber in a suitable receptacle. A substantially uniform distribution of the added fiber results, the adhering fiber tending to pick up and loosely retain the longer non-adherent fiber. Where preformed rubber is used as part of the mix, it may be also added, or some of it, at this time, the finely divided particles being added in appropriate amount together with the added fiber and both tumbled dry. Working in this way, after the tumbling has produced a substantially uniform mixing, fluid latex is admitted and the tumbling continued until all of the surface of the coated grain, fiber and preformed rubber particles, if used, are wet with latex. By experience I find it usually desirable to use a substantial excess of latex during the wetting operation, as such excess materially reduces the time required to effect complete wetting and also, and in consequence, reduces the attrition of the intermediate bond.

In making grinding wheels and articles, as contra-distinguished to cutting wheels, the finer the grain, the less the desirability of addition of preformed rubber, and vice versa. In the case of very fine grained materials, the rubber would necessarily be used in dust form and would have but little advantage.

In speaking of preformed rubber under the name "rubber", I mean the usual rubber compositions.

What I claim is:—

1. An abrasive article comprising granular abrasive matter bonded by a composite binder carrying reinforcing fiber in random arrangement, said binder comprising a cementing bond layer cohering to the individual grains and also cohering to fiber, said composite binder also comprising a continuous bond of rubber.

2. An abrasive article comprising grains of abrasive bonded together, two grain sizes being present, the bonding means comprising rubber and cementing means cohering to said abrasive and to said rubber, and the bonding means further comprising fiber in random distribution.

3. An abrasive article comprising grains of abrasive coated with an intermediate binder and a bonding means bonding together said coated grains, said bonding means comprising rubber and part of said rubber being gelled latex; said bonding means being reinforced by fiber in random distribution.

4. An abrasive article comprising grains of abrasive coated with an intermediate binder cohering thereto and a bonding means for the coated grains, said bonding means comprising rubber derived in part from gelled latex and being reinforced by fiber in random distribution, part of such fiber extending into the intermediate binder.

5. An abrasive wheel comprising a central reinforcing layer of fabric and lateral faces composed of abrasive grains carrying a coating of intermediate binder and bonded with rubber derived in part from gelled latex, said rubber containing reinforcing fiber in random arrangement.

6. As a new abrasive article, a body containing granular abrasive, a discontinuous bonding means adhering to the grains and a continuous bond of rubber containing fiber in random arrangement, said fiber extending across the interface between the discontinuous bond and the continuous bond.

7. As a new abrasive article, a body containing granular abrasive, a discontinuous bonding means adhering to the grains and a continuous bond of rubber containing fiber in random arrangement, said fiber extending across the interface between the discontinuous bond and the continuous bond, part of said rubber being gelled latex.

8. As a new abrasive article, a body containing granular abrasive, a discontinuous bonding means adhering to the grains and a continuous bond of rubber containing fiber in random arrangement, said fiber extending across the interface between the discontinuous bond and the continuous bond, the grains of the abrasive being of different sizes so as to decrease the total void volume.

9. An abrasive wheel comprising granular abrasive material with the grains bonded together by a composite binder composed of an intermediate binder coating and cohering to the individual grains and a continuous bond of rubber reinforced by fiber, said wheel having a central reinforcing layer with greater concentration of fiber.

In testimony whereof, I have hereunto affixed my signature.

WILLIAM BURTON WESCOTT.